United States Patent
Aoki

(10) Patent No.: US 9,815,137 B2
(45) Date of Patent: Nov. 14, 2017

(54) MEASURING METHOD AND MEASURING DEVICE FOR MEASURING ROTATIONAL ANGLE OF SERVO MOTOR

(71) Applicant: FANUC CORPORATION, Yamanashi (JP)

(72) Inventor: Toshimichi Aoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 71 days.

(21) Appl. No.: 15/072,757

(22) Filed: Mar. 17, 2016

(65) Prior Publication Data
US 2016/0282148 A1 Sep. 29, 2016

(30) Foreign Application Priority Data
Mar. 27, 2015 (JP) ................................. 2015-067718

(51) Int. Cl.
*G01D 5/244* (2006.01)
*B23K 11/36* (2006.01)
(Continued)

(52) U.S. Cl.
CPC ............. *B23K 11/36* (2013.01); *B23K 11/115* (2013.01); *B23K 11/252* (2013.01)

(58) Field of Classification Search
CPC G01D 5/20; G01D 5/244; G01N 1/28; G01N 2011/0066; G01N 2011/0073;
(Continued)

(56) References Cited

U.S. PATENT DOCUMENTS 5,582,747 A * 12/1996 Sakai .................... B23K 11/253
219/109
5,883,355 A * 3/1999 Kaneshima ........... B23K 11/311
219/86.51
(Continued)

FOREIGN PATENT DOCUMENTS

JP 9150278 A 6/1997
JP 1094882 A 4/1998
(Continued)

OTHER PUBLICATIONS

Untranslated Notification of Reasons for Refusal mailed by Japan Patent Office (JPO) for Application No. JP 2015-067718, dated Mar. 14, 2017, 2 pages.
(Continued)

Primary Examiner — Tung X Nguyen
Assistant Examiner — Robert P Alejnikov, Jr.
(74) Attorney, Agent, or Firm — Fredrikson & Byron, P.A.

(57) ABSTRACT

As a correction amount is acquired a deviation between a first rotational angle of a servo motor when a reference movable electrode is brought into contact with a reference opposite electrode and a second rotational angle of the motor when the reference movable electrodes pushes in the reference opposite electrode with a predetermined pressing force; and a third rotational angle of the servo motor when a movable electrode to be measured pushes in an opposite electrode to be measured with the same pressing force is corrected based on the correction amount.

12 Claims, 4 Drawing Sheets

(51) Int. Cl.
*B23K 11/11* (2006.01)
*B23K 11/25* (2006.01)

(58) Field of Classification Search
CPC ..... G01N 2011/008; G01N 2011/0086; G01N 2011/0093; G01N 27/026; G01N 27/221; G01R 27/26; G01R 27/2617; G01R 31/12; B23K 11/115; B23K 11/25; B23K 11/252; B23K 11/251; B23K 11/253; B23K 11/255
USPC ........ 324/71.1; 901/42; 219/108–111, 86.25, 219/86.41, 86.51
See application file for complete search history.

(56) References Cited

U.S. PATENT DOCUMENTS

| | | | | |
|---|---|---|---|---|
| 2005/0045597 | A1* | 3/2005 | Wang | B23K 11/11 219/110 |
| 2009/0001056 | A1* | 1/2009 | Takahashi | B23K 11/315 219/86.7 |
| 2009/0007693 | A1* | 1/2009 | Aoki | B23K 11/255 73/850 |
| 2011/0180516 | A1* | 7/2011 | Takahashi | B23K 11/255 219/86.41 |
| 2012/0000891 | A1* | 1/2012 | Nakanishi | B23K 11/115 219/86.7 |
| 2014/0291300 | A1* | 10/2014 | Amagata | B23K 11/115 219/90 |

FOREIGN PATENT DOCUMENTS

| | | |
|---|---|---|
| JP | 200235951 A | 2/2002 |
| JP | 2002283059 A | 10/2002 |
| JP | 4880021 B2 | 2/2012 |

OTHER PUBLICATIONS

English machine translation of Decision to Grant a Patent mailed by JPO for Application No. JP 2015-067718, dated Mar. 14, 2017, 2 pages.

Untranslated Decision to Grant a Patent mailed by Japan Patent Office (JPO) for Application No. JP 2015-067718, dated May 9, 2017, 3 pages.

English machine translation of Decision to Grant a Patent mailed by JPO for Application No. JP 2015-067718, dated May 9, 2017, 3 pages.

English Abstract and Machine Translation for Japanese Publication No. 2002-035951 A, published Feb. 5, 2002, 10 pgs.

English Abstract and Machine Translation for Japanese Publication No. 10-094882 A, published Apr. 14, 1998, 10 pgs.

English Abstract and Machine Translation for Japanese Publication No. 09-150278 A, published Jun. 10, 1997, 6 pgs.

English Abstract and Machine Translation for Japanese Publication No. 2002-283059 A, published Oct. 2, 2002, 13 pgs.

English Abstract and Machine Translation for Japanese Publication No. 4880021 B2, published Feb. 22, 2012, 31 pgs.

* cited by examiner

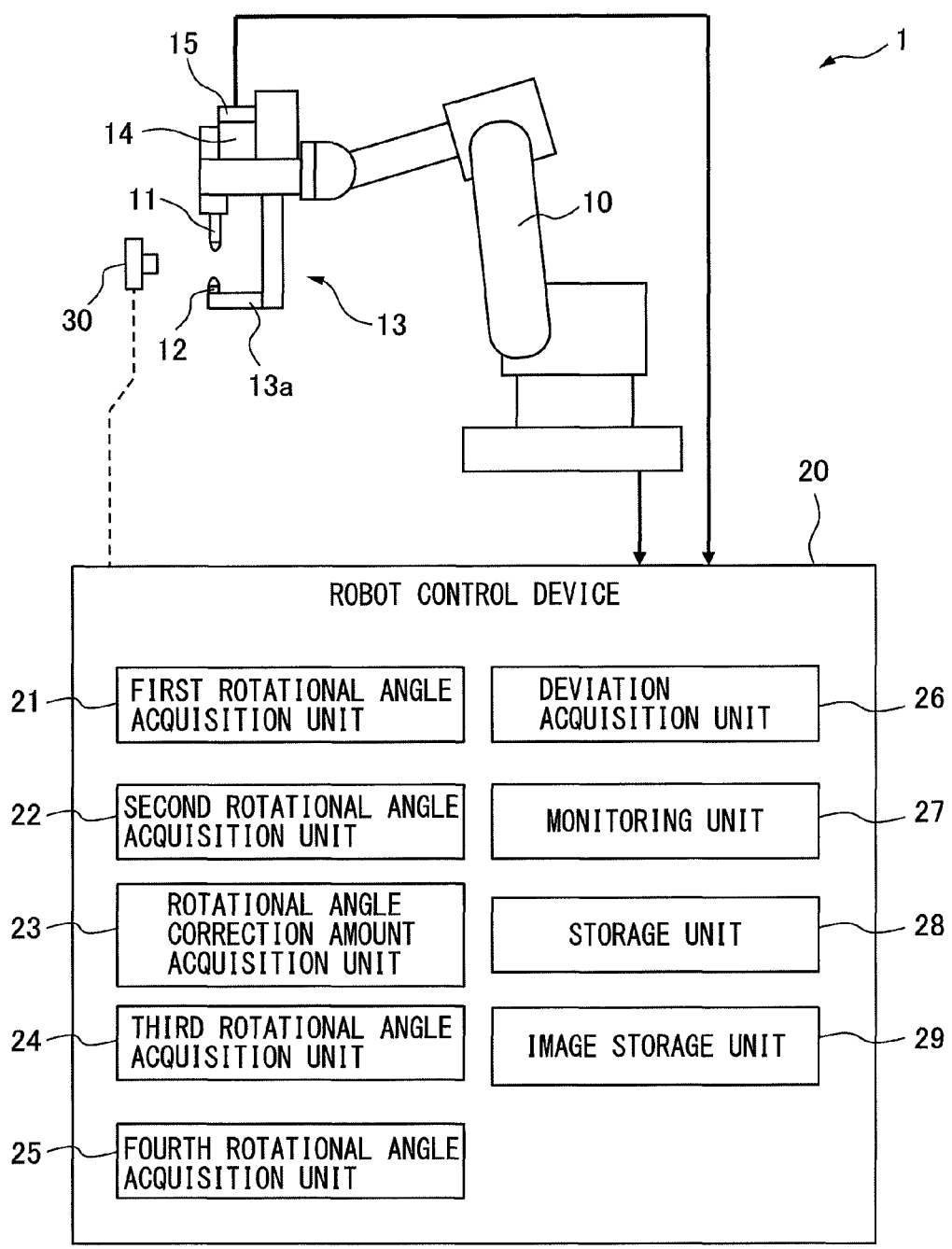

STATE (a)  STATE (b)

STATE (c)  STATE (d)

MEASURING METHOD AND MEASURING DEVICE FOR MEASURING ROTATIONAL ANGLE OF SERVO MOTOR

BACKGROUND OF THE INVENTION

1. Field of the Invention

The present invention relates to a measuring method for measuring a rotational angle of a servo motor that drives a spot welding gun, and a measuring device that performs such a method.

2. Description of the Related Art

Generally, a spot welding gun includes a movable electrode that is driven by a servo motor, and an opposite electrode disposed in opposing relationship to the movable electrode. Position control of the movable electrode is performed based on a rotational angle of the servo motor when a distal end of the movable electrode and a distal end of the opposite electrode contact or abut each other.

However, during a spot welding operation, sometimes the distal end of the movable electrode and/or the distal end of the opposite electrode is deformed or worn out each time welding is performed or an oxide film may adhere to the movable electrode and/or the opposite electrode. Therefore, it is not possible to flow a welding current efficiently through the movable electrode and the opposite electrode.

Thus, it is necessary to periodically dress the surfaces of the movable electrode and the opposite electrode, but the distal end position of the movable electrode and the distal end position of the opposite electrode are changed due to the dressing operation. Since a position control of the movable electrode is performed based on contact rotational angle as described hereinbefore, it is necessary to detect again the contact rotational angle after the dressing operation.

In Japanese Laid-open Patent Publication No. 2002-283059, a step of pressing a movable electrode against a fixed electrode until a load imparted to a distal end of the movable electrode reaches a first threshold value, and a storing step of storing, as a reference position, a position of a shaft of the movable electrode when the movable electrode is retracted after the load reached the first threshold value and the load imparted to the distal end of the movable electrode reaches a second threshold value smaller than the first threshold value is disclosed.

Further, in Japanese Patent No. 4,880,021, a minimum torque limit is obtained which enables a movable electrode to operate. When the torque limit is reached as a result of the movable electrode contacting an opposite electrode, the movable electrode is stopped.

SUMMARY OF THE INVENTION

However, when the spot gun is used for a long period of time, a speed reducer and a mechanical element such as bearing of the spot welding gun are worn out, and grease as a lubricant oil is degraded, due to aging deterioration. Thus, there is a tendency that the sliding resistance when the movable electrode is operated is increased. Consequently, the current of the servo motor is increased as compared with that before the sliding resistance is increased.

In such a circumstance, when the technique of Japanese Laid-open Patent Publication No. 2002-283059 is applied, the sliding resistance is increased, and therefore the movable electrode contacts the opposite electrode even though such contact is not made actually. In Japanese Laid-open Patent Publication No. 2002-283059, it is possible to set the first threshold value to be relatively large in view of the increase of the sliding resistance described above. However, in such an instance, the movable electrode pushes the opposite electrode until the load reaches the first threshold value. Thus, due to the hysteresis of the speed reducer, the movable electrode may not maintain contact with the opposite electrode.

In Japanese Patent No. 4,880,021, in order to set a torque limit, it is desirable to prevent the opposite electrode from contacting a workpiece by securing a sufficient distance between the opposite electrode and the workpiece. Testing of the electrodes needs to be performed during production operation, but it is undesirable in that time is taken to secure a sufficient distance between the opposite electrode and a workpiece.

In this regard, it may be considered to set beforehand the torque limit in Japanese Patent No. 4,880,021. However, as in the case of Japanese Laid-open Patent Publication No. 2002-283059, when the necessary current or torque is increased due to aging deterioration of a mechanical element during operation of the movable electrode, the operation of the movable electrode becomes stopped before the movable electrode contacts the opposite electrode.

The present invention has been made in view of such circumstances, and has for an object to provide a measuring method that makes it possible to accurately acquire a rotational angle even when a mechanical element of a spot welding gun is subjected to deterioration due to aging, and a measuring apparatus that performs such a method.

In order to achieve the foregoing object, according to a first aspect of the present invention, there is provided a measuring method for measuring a rotational angle of a servo motor in a spot welding gun to which a movable electrode driven by the servo motor and an opposite electrode disposed in opposing relationship to the movable electrode are mounted, the measuring method including steps of: a first rotational angle acquisition step that, in a state in which a reference movable electrode and a reference opposite electrode are mounted to the spot welding gun, acquires, as a first rotational angle, a rotational angle of the servo motor when the reference movable electrode is brought into contact with the reference opposite electrode by driving the servo motor; a second rotational angle acquisition step that acquires, as a second rotational angle, a rotational angle of the servo motor when the reference movable electrode is pushed in with respect to the reference opposite electrode with a predetermined pressing force; a rotational angle correction amount acquisition step that acquires, as a rotational angle correction amount, a deviation between the first rotational angle and the second rotational angle; a third rotational angle acquisition step that, in a state in which a movable electrode to be measured and an opposite electrode to be measured are mounted to the spot welding gun, acquires, as a third rotational angle, a rotational angle of the servo motor when the movable electrode to be measured is pushed in with respect to the opposite electrode to be measured with a pressing force substantially the same as the pressing force when the second rotational angle is acquired; and a fourth rotational angle acquisition step that acquires a fourth rotational angle by correcting the third rotational angle with the rotational angle correction amount.

According to a second aspect of the present invention, the measuring method of the first aspect further includes a step that obtains a deviation between the first rotational angle and the fourth rotational angle after the fourth rotational angle acquisition step.

According to a third aspect of the present invention, in the measuring method of the first or second aspect, at the first rotational angle acquisition step: a current or an estimated disturbance torque of the servo motor is monitored; and when the current or the estimated disturbance torque exceeds a predetermined threshold value, it is determined that the reference movable electrode contacts the reference opposite electrode, so that the reference movable electrode is stopped and a rotational angle of the servo motor is acquired as the first rotational angle.

According to a fourth aspect of the present invention, in the measuring method of the first or second aspect, at the first rotational angle acquisition step: a predetermined torque limit is applied to the servo motor; and a rotational angle of the servo motor when the reference movable electrode is stopped by the torque limit as a result of the reference movable electrode contacting the reference opposite electrode is acquired as the first rotational angle.

According to a fifth aspect of the present invention, in the measuring method of the first or second aspect, at the first rotational angle acquisition step:

an image of at least one of the reference movable electrode and the reference opposite electrode is successively imaged at an imaging position; and based on the imaged image, a rotational angle of the servo motor when the reference movable electrode contacts the reference opposite electrode is acquired as the first rotational angle.

According to a sixth aspect of the present invention, in the measuring method of any one of the first to fourth aspects, the predetermined pressing force is made such that the current or the estimated disturbance torque is sufficiently larger than a load on the servo motor which is caused when the movable electrode is moved.

According to a seventh aspect of the present invention, there is provided a measuring device for measuring a rotational angle of a servo motor in a spot welding gun to which a movable electrode driven by the servo motor and an opposite electrode disposed in opposing relationship to the movable electrode are mounted, the measuring device including: a first rotational angle acquisition unit that, in a state in which a reference movable electrode and a reference opposite electrode are mounted to the spot welding gun, acquires, as a first rotational angle, a rotational angle of the servo motor when the reference movable electrode is brought into contact with the reference opposite electrode by driving the servo motor; a second rotational angle acquisition unit that acquires, as a second rotational angle, a rotational angle of the servo motor when the reference movable electrode is pushed in with respect to the reference opposite electrode with a predetermined pressing force; a rotational angle correction amount acquisition unit that acquires, as a rotational angle correction amount, a deviation between the first rotational angle and the second rotational angle; a third rotational angle acquisition unit that, in a state in which a movable electrode to be measured and an opposite electrode to be measured are mounted to the spot welding gun, acquires, as a third rotational angle, a rotational angle of the servo motor when the movable electrode to be measured is pushed in with respect to the opposite electrode to be measured with a pressing force substantially the same as the pressing force when the second rotational angle is acquired; and a fourth rotational angle acquisition unit that acquires a fourth rotational angle by correcting the third rotational angle with the rotational angle correction amount.

According to an eighth aspect of the present invention, the measuring device of the seventh aspect further includes a deviation calculating unit that acquires a deviation between the first rotational angle and the fourth rotational angle after the fourth rotational angle is acquired.

According to a ninth aspect of the present invention, in the measuring device of the seventh or eighth aspect, the first rotational angle acquisition unit monitors a current or an estimated disturbance torque of the servo motor, and when the current or the estimated disturbance torque exceeds a predetermined threshold value, determines that the reference movable electrode contacts the reference opposite electrode, thereby stopping the reference movable electrode and acquiring a rotational angle of the servo motor as the first rotational angle.

According to a tenth aspect of the present invention, in the measuring device of the seventh or eighth aspect, the first rotational angle acquisition unit applies a predetermined torque limit to the servo motor, and acquires, as the first rotational angle, a rotational angle of the servo motor when the reference movable electrode is stopped by the torque limit as a result of the reference movable electrode contacting the reference opposite electrode.

According to an eleventh aspect of the present invention, in the measuring device of the seventh or eighth aspect, the first rotational angle acquisition unit further includes an imaging unit that successively images, at an imaging position, an image of at least one of the reference movable electrode and the reference opposite electrode, wherein based on the imaged image, the first rotational angle acquisition unit acquires, as the first rotational angle, a rotational angle of the servo motor when the reference movable electrode contacts the reference opposite electrode.

According to a twelfth aspect of the present invention, in the measuring device of any one of the seventh to eleventh aspects, the predetermined pressing force is made such that the current or the estimated disturbance torque is sufficiently larger than a load on the servo motor which is caused when the movable electrode is moved.

These and other objects, features, and advantages of the present invention will become more clear from a detailed description of exemplary embodiments of the present invention illustrated in the accompanying drawings.

BRIEF DESCRIPTION OF THE DRAWINGS

FIG. 1 is a schematic view of a spot welding system including a measuring device.

DETAILED DESCRIPTION

Figure 2A:
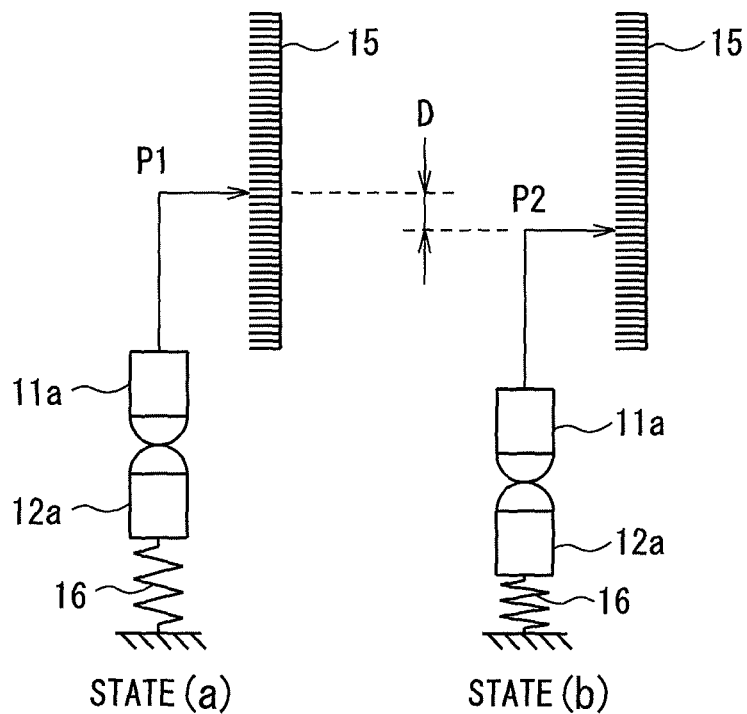
FIG. 2A is a first view for explaining acquisition of a rotational angle.

Hereinafter, with reference to the accompanying drawings, description will be made of embodiments of the present invention. In the drawings, like members are denoted by like reference numerals. In order to facilitate understanding, the scale of the drawings is changed arbitrarily.

FIG. 1 is a schematic view of a spot welding system including a measuring device based on the present invention. The spot welding system 1 illustrated in FIG. 1 mainly includes a robot 10, for example, an articulated robot, and a robot control device 20 that controls the robot 10.

As illustrated in FIG. 1, a spot welding gun 13 is provided at a distal end of an arm of the robot 10. The robot 10 functions to position a distal end of an opposite electrode 12, which will be described hereinafter, of the spot welding gun 13, at a desired position.

In an unillustrated embodiment, the robot 10 grips a workpiece by a hand provided at the arm distal end, and positions the workpiece with respect to the distal end of the opposite electrode 12 of the spot welding gun 13 installed on a pedestal. In this instance, the pedestal may be provided with a drive mechanism that change the orientation of the welding gun 13.

The spot welding gun 13 illustrated in FIG. 1 is a so-called C-type spot gun and includes a movable electrode 11 and the opposite electrode 12 disposed in opposing relationship to the movable electrode 11. The movable electrode 11 is driven by a servo motor 14 so as to be advanced toward and retracted from the opposite electrode 12. The opposite electrode 12 may be movable together with the movable electrode 11. Further, the spot welding gun 13 may be an X-type spot gun having electrodes attached to a pair of gun arms, respectively, which are openable and closable by a pressure cylinder.

The servo motor 14 that drives the movable electrode 11 may be controlled by the robot control device 20 as a control shaft annexed to the robot 10. Further, the servo motor 14 is provided with a rotational angle detector 15 that detects a rotational angle of the servo motor 14.

However, the servo motor 14 may be controlled by another control device (not illustrated). In such an instance, the other control device is connected to the robot control device 20 via digital communication means and can perform transmission and reception of a control signal or feedback information of the servo motor 14 between it and the robot control device 20. The feedback information includes a rotational angle of the servo motor 14 and a motor current flowing through the servo motor 14. The position of the movable electrode 11 can be determined from the rotational angle of the servo motor 14, and the motor torque can be determined from the motor current. These may also be handled as the feedback information.

The robot control device 20, which may be a digital computer, functions as a measuring device for measuring a rotational angle of the servo motor 14. As illustrated in FIG. 1, the robot control device 20 includes: a first rotational angle acquisition unit 21 that acquires, as a first rotational angle P1, a rotational angle of the servo motor 14 when a reference movable electrode 11a is brought into contact with a reference opposite electrode 12a by driving the servo motor 14 in a state in which the reference movable electrode 11a and the reference opposite electrode 12a are mounted to the stop welding gun 13; a second rotational angle acquisition unit 22 that acquires, as a second rotational angle A2, a rotational angle of the servo motor 14 when the reference movable electrode 11a is pushed in with respect to the reference opposite electrode 12a with a predetermined pressing force; and a rotational angle correction amount acquisition unit 23 that acquires, as a rotational angle correction amount, a deviation between the first rotational angle P1 and the second rotational angle A2.

Further, the robot control device 20 includes: a third rotational angle acquisition unit 24 that acquires, as a third rotational angle A3, a rotational angle of the servo motor 14 when a movable electrode 11b to be measured is pushed in with respect to an opposite electrode 12b to be measured, with the same pressure as that with which the second rotational angle P2 is acquired, in a state that the movable electrode 11b to be measured and the opposite electrode 12b to be measured are mounted to the spot welding gun 13; and a fourth rotational angle acquisition unit 25 that acquires a fourth rotational angle P4 by correcting the third rotational angle P3 in accordance with the rotational angle correction amount.

Further, the robot control device 20 includes: a deviation calculating unit 26 that obtains a deviation between the first rotational angle P1 and the fourth rotational angle P4 after the fourth rotational angle P4 is acquired at the fourth rotational angle acquisition unit 25; a monitoring unit 27 that monitors a current flowing through the servo motor 14 or an estimated disturbance torque of the servo motor 14; and a storage unit 28 that stores various data and a threshold value, e.g., a torque limit of the servo motor 14. Preferably, the monitoring unit 27 and the storage unit 28 are associated with the first rotational angle acquisition unit 21 or included in the first rotational angle acquisition unit 21.

Further, in the first rotational angle acquisition unit 21, an imaging unit 30 (e.g., camera) is connected to the robot control device 20, which successively images, at an imaging position, an image of at least one of the reference movable electrode 11a and the reference opposite electrode 11b. Further, the robot control device 20 includes an image storage unit 29 that successively stores images imaged by the imaging unit 30. Preferably, the image storage unit 29 and the imaging unit 30 are associated with the first rotational angle acquisition unit 21. Further, the robot control device 20 is capable of communicating with an unillustrated external device (e.g., line control panel).

Figure 2B:
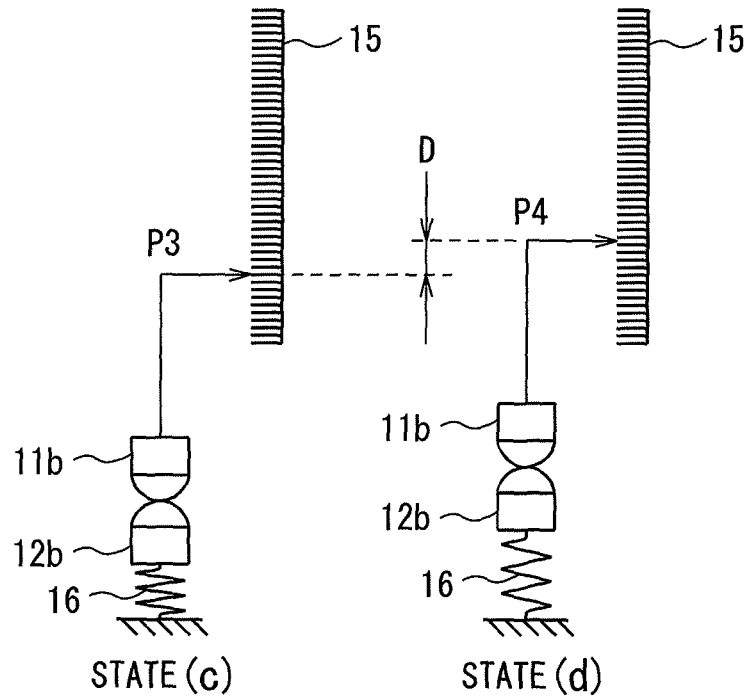
FIG. 2B is a second view for explaining acquisition of a rotational angle.

FIGS. 2A and 2B are views for explaining acquisition of a rotational angle. In order to facilitate understanding, the rotational angle detector 15 illustrated in FIG. 1 is illustrated as a graduated scale in FIGS. 2A and 2B. In other words, the graduation of the scale represents the rotation angle of the servo motor 14.

Further, as can be seen with reference to FIG. 1, the base end of the opposite electrode 12 is attached to a cantilever type gun arm 13a of the spot welding gun 13. In this regard, the cantilever type gun arm 13a is schematically illustrated as an elastic element 16 in FIGS. 2A and 2B.

State (a) and state (b) illustrated in FIG. 2A represent a first rotational angle detection step and a second rotational angle detection step, respectively. The movable electrode 11a and the opposite electrode 12a in each of the states (a) and (b) are unused new electrodes, respectively. Such electrodes are a reference movable electrode 11a and a reference opposite electrode 12a, each of which serves as a reference for measuring a rotational angle.

Further, state (c) and state (d) illustrated in FIG. 2B represent a third rotational angle detection step and a fourth rotational angle detection step, respectively. The movable electrode 11b and the opposite electrode 12b in each of the states (c) and (d) are in an arbitrary state, e.g., a state in which the electrodes experienced aging to some extent. In FIG. 2B, for example, there are illustrated a movable electrode 11 and an opposite electrode 12, each of which is shortened by polishing. Such electrodes are referred to as the movable electrode 11b for which a rotational angle is to be measured and the opposite electrode 12b for which a rotational angle is to be measured.

In an unillustrated embodiment, the reference movable electrode 11a and the reference opposite electrode 12a may be electrodes which experienced aging, and each of the movable electrode 11b to be measured and the opposite electrode 12b to be measured may be an electrode longer than each of the reference movable electrode 11a and the reference opposite electrode 12a, e.g., an unused electrode.

Figure 3A:
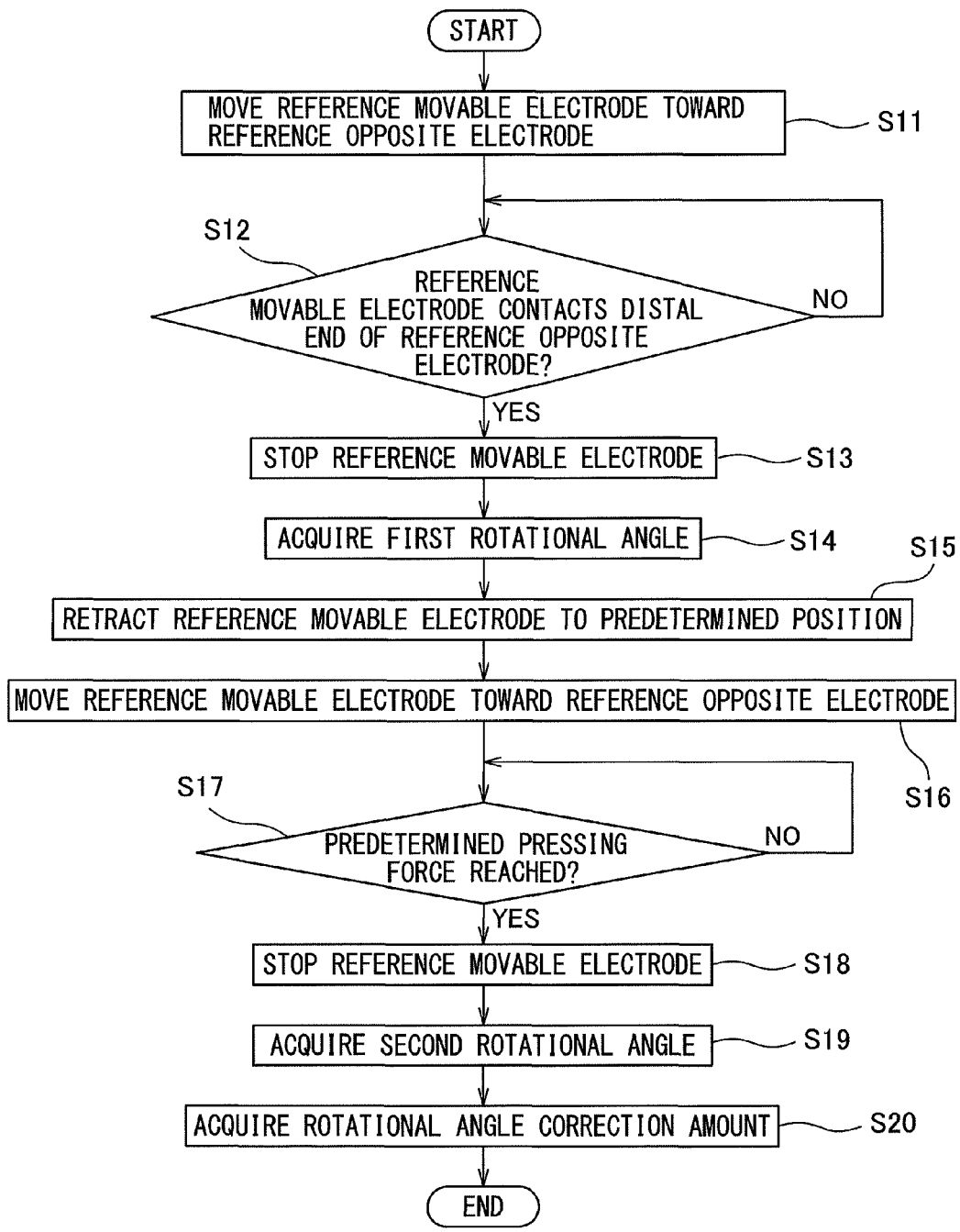
FIG. 3A is a view illustrating a first rotational angle acquisition step, a second rotational angle acquisition step, and a rotational angle correction amount acquisition step in a measuring method based on the present invention.
Figure 3B:
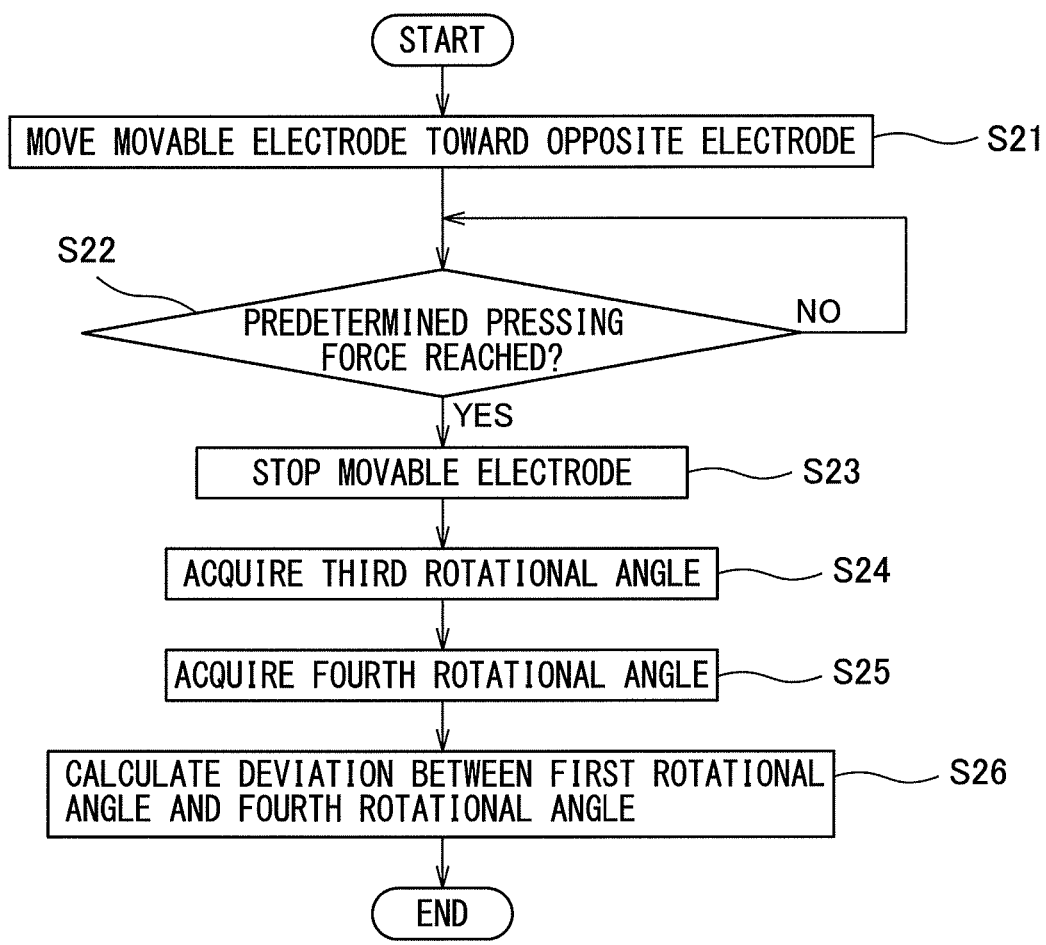
FIG. 3B is a view illustrating a third rotational angle acquisition step and a fourth rotational angle acquisition step in the measuring method based on the present invention.

FIG. 3A is a view illustrating the first angle acquisition step, the second rotational angle acquisition step, and the rotational angle correction amount acquisition step in the measuring method based on the present invention. Further, FIG. 3B is a view illustrating the third angle acquisition step and the fourth angle acquisition step in the measuring method based on the present invention. Hereinafter, referring to FIGS. 1 through 3B, description will be made of the measuring method of the present invention for measuring a rotational angle of the servo motor 14.

First, the reference movable electrode 11a and the reference opposite electrode 12a are mounted to the spot welding gun 13. Then, at step S11 in FIG. 3A, the reference movable electrode 11a is moved toward the reference opposite electrode 12a by driving the servo motor 14. Further, at step S12, it is determined whether the reference movable reference 11a contacts the distal end of the reference opposite electrodes 12a.

Let it be assumed now that the determination as to whether the reference movable electrode 11a contacts the reference opposite electrode 12a is performed by at least one of the following three methods (1) to (3).

(1) When the reference movable electrode 11a is moved toward the reference opposite electrode 12a, the monitoring unit 27 monitors a current or an estimated disturbance torque of the servo motor 14. Further, when an increment of the current or the estimated disturbance torque exceeds a predetermined threshold value as a result of the reference movable electrode 11a contacting the reference opposite electrode 12a, it is regarded that the reference movable electrode 11a contacts the reference opposite electrode 12a. It is required that the increment be a minimum value such that the reference movable electrode 11a does not push in the reference opposite electrode 12a. Let it be assumed that a predetermined threshold value for the increment is obtained beforehand by experiment or the like and stored in the storage unit 28. However, since the spot welding gun 13 is subjected to deterioration due to aging after the predetermine threshold value is obtained, it is preferable, as far as possible, to obtain the predetermined value when it is desired to measure a rotational angle of the servo motor 14.

(2) A minimum torque limit with which the reference movable electrode 11a can operate is applied. In this instance, when the reference movable electrode 11a contacts the reference opposite electrode 12a, the reference movable electrode 11a requires an output, or a torque to attempt to push in the reference opposite electrode 12a. However, since the output quantity is limited by the torque limit, the reference movable electrode 11a is unable to push in the reference opposite electrode 12a, and the moving speed of the reference movable electrode 11a is gradually reduced. When the moving speed is lowered to a predetermined speed, it is regarded that the reference movable electrode 11a contacts the opposite electrode. It is not required that the moving speed be reduced completely to zero. Let it be assumed that the torque limit and the predetermined speed are obtained beforehand by experiment or the like and stored in the storage unit 28. However, since the spot welding gun 13 is subjected to deterioration due to aging after the torque limit is obtained, it is preferable, as far as possible, to obtain the torque limit or the like when it is desired to measure a rotational speed of the servo motor 14.

(3) The imaging unit 30 is used which is capable of imaging one or both of the reference movable electrode 11a and the reference opposite electrode 12a (refer to FIG. 1). The imaging unit 30 successively images these electrodes, and the imaging data is successively stored in the image storage unit 29. When the imaging data of the imaging unit 30 is obtained which includes the same feature as the state in which the reference movable electrode 11a contacts the reference opposite electrode 12a, it is regarded that the reference movable electrode 11a contacts the reference opposite electrode 12a, it is also possible to adopt another method that can confirm that the reference movable electrode 11a contacts the reference opposite electrode 12a. Alternatively, it is possible that the operator may visually confirm that the reference movable electrode 11a contacts the reference opposite electrode 12a.

When it is determined that the reference movable electrodes 11a contacts the reference opposite electrode 12a, the procedure proceeds to step S13 in FIG. 3A. At step S13, the reference movable electrode 11a is stopped via the servo motor 14. Subsequently, at step S14, the first rotational angle acquisition unit 21 acquires the first rotational angle P1 (refer to the state (a) of FIG. 2A). In the state (a), the length of the elastic element 16 is the natural length since the reference movable electrode 11a does not press the reference opposite electrode 12a.

Then, at step S15, the reference movable electrode 11a is retracted to a predetermined position so as to release the spot welding gun 13. However, step S15 may be omitted, and the procedure may proceed from the state in which the reference movable electrode 11a contacts the reference opposite electrode 12a to subsequent step S16. In this instance, there is no need to take into account of the hysteresis of the speed reducer.

At step S16, the reference movable electrode 11a is moved again toward the reference opposite electrode 12a by driving the servo motor 14. Further, confirmation is made of a pressing force with which the reference movable electrode 11a presses the reference opposite electrode 12a.

At step S17, it is determined whether the pressing force reaches a predetermined pressing force. The predetermined pressing force has a value greater than 0 kgf with which the reference movable electrode 11a can sufficiently push in the reference opposite electrode 12a. Alternatively, the predetermined pressing force is made to be sufficiently larger than a load on the servo motor 14 which is caused when the reference movable electrode 11a or the movable electrode 11b to be measured is caused to be moved by the current or the estimated disturbance torque of the servo motor 14. In such an instance, the second rotational angle P2 and the third rotational angle P3 can be acquired in a state in which the reference movable electrode 11a positively pushes in the reference opposite electrode 12a or in a state in which the movable electrode 11b to be measured positively pushes in the opposite electrode 12b to be measured.

Let it be assumed that determination as to whether the reference movable electrode 11a presses the reference opposite electrode 12a with the predetermined pressing force is performed as follows. The monitoring unit 27 monitors the current or the estimated disturbance torque of the servo motor 14 when the reference movable electrode 11a is moved toward the reference opposite electrode 12a. When an increment of the current or the estimated disturbance torque exceeds another predetermined threshold value due to the reference movable electrode 11a pressing the reference opposite electrode 12a, it is regarded that the reference movable electrode 11a pushes in the reference opposite electrode 12a with the predetermined pressing force.

Preferably, the relationship between the current or the estimated disturbance torque and the pressing force is calibrated beforehand using a force sensor or the like, and the data of the calibration is stored in the storage unit 28 of the robot control device 20. In this instance, the pressing force with which the reference movable electrode 11a presses the reference opposite electrode 12a can be determined without the use of the force sensor or the like.

When the monitoring unit 27 monitors the current or the estimated disturbance torque, it is preferable to confirm not only that the current or the estimated disturbance torque is increased up to a value corresponding to the predetermined pressing force but also that such a state persists over a predetermined time period. In this instance, it is possible to more reliably confirm that the reference movable electrode 11a pushes in the reference opposite electrode 12a with the predetermined pressing force. In this regard, any method may be adopted that makes it possible to confirm that the reference movable electrode 11a pushes in the reference opposite electrode 12a with the predetermined pressing force.

When it is determined that the reference movable electrode 11a pushes in the reference opposite electrode 12a with the predetermined pressing force, the procedure proceeds to step S18 of FIG. 3A. At step S18, the reference movable electrode 11a is stopped via the servo motor 14. Subsequently, at step S19, the second rotational angle acquisition unit 22 acquires the second rotational angle P2 (refer to the state (b) of FIG. 2A).

Then, at step S20, the rotational angle correction amount acquisition unit 23 calculates a deviation between the first rotational angle P1 and the second rotational angle P2 as a rotational angle correction amount D (=P2−P1). As illustrated in the state (b) of FIG. 2A, as compared with the state (a), the elastic element 16 is contracted since the above-described pressing force is acting thereon. The contraction amount of the elastic element 16 is the amount of movement from the position in the state (a) of the reference movable electrode 11a, which corresponds to the rotational angle correction amount D. According to Hook's law, the following equation holds: (the pressing force)=(the rotational angle correction amount D)×(the spring constant of the elastic element 16).

Thereafter, the reference movable electrode 11a and the reference opposite electrode 12a are removed, and the movable electrode 11b to be measured and the opposite electrode 12b to be measured are mounted to the spot welding gun 13. At step S21 of FIG. 3B, the movable electrode 11b is moved toward the opposite electrode 12b by driving the servo motor 14.

Subsequently, at step S22, it is determined whether the pressing force with which the movable electrode 11b presses the opposite electrode 12b reaches the predetermined pressing force. This determination is similar to that described at step S17, and therefore a repeated description thereof is omitted.

When it is determined that the movable electrode 11b to be measured pushes in, with the predetermined pressing force, the opposite electrode 12b to be measured, the procedure proceeds to step S23 of FIG. 3B. At step S23, the movable electrode 11b to be measured is stopped via the servo motor 14. Then, at step S24, the third rotational angle acquisition unit 24 acquires the third rotational angle P3 (refer to state (c) of FIG. 2B).

Subsequently, at step S25, the fourth rotational angle acquisition unit 25 obtains the fourth rotational angle P4 (=P3−D) by correcting the third rotational angle P3 with the rotational angle correction amount D. In the state (c), too, the elastic element 16 receives a pressing force similar to that in the state (b). Even when the lengths of the movable electrodes 11a, 11b and the opposite electrodes 12a, 12b are changed between the state (b) and the state (c), the elastic element 16 is not subjected to any change. Thus, the above-described equation holds in the state (c) as well.

In order to establish a state in which the pressing force becomes nil, i.e., a state in which the movable electrode 11b precisely contacts the opposite electrode 12b, it is only necessary to cause the movable electrode 11b to be retracted from the state (c) by the rotational angle correction amount D. In this manner, at step S25, the fourth rotational angle P4, which is calculated from the third rotational angle P3 and the rotational angle correction amount D, is acquired as the rotational angle of the servo motor 14 when the movable electrode 11b to be measured and the opposite electrode 12b to be measured contact each other.

State (d) illustrated in FIG. 2B is a state in which the movable electrode 11b is retracted from the state (c) by the rotational angle correction quantity D. In the state (d), the polished movable electrode 11b and the opposite electrode 12b precisely contact each other. Since the fourth rotational angle P4 is obtained from the above-described equation, it is not necessary to cause the movable electrode 11b to be actually retracted to the state (d).

Then, at step S26, the deviation calculating unit 26 calculates a deviation between the fourth rotation angle P4 and the first rotational angle P1. When the movable electrode 11b to be measured and the opposite electrode 12b to be measured are of the same kind as the reference movable electrode 11a and the reference opposite electrode 12a, it is possible to grasp an amount of change in position of the distal end of each of the reference movable electrode 11a and the reference opposite electrode 12a based on an amount of change of the rotational angle. This similarly applies in a case where the reference movable electrode 11a, whose length is changed via dressing operation or the like is used as the movable electrode 11b to be measured or the like.

In this manner, in the present invention, the third rotational angle P3 when the movable electrode 11b to be measured and the opposite electrode 12b to be measured are used is corrected based on the rotational angle correction amount D when the reference movable electrode 11a and the reference opposite electrode 12a are used. Thus, when a load on the servo motor 14, which may be caused when the movable electrode 11b is moved, is changed due to various factors, e.g., even when a mechanical element is subjected to deterioration due to aging, it is possible to accurately acquire a rotational angle of the servo motor 14 when the movable electrode 11b and the opposite electrode 12b, which are to be measured, contact or abut each other.

In this regard, in the conventional technology, when a mechanical element is subjected to deterioration due to aging, there is a possibility that a rotational angle of a servo motor after a movable electrodes pushes in an opposite electrode may be regarded as a rotational angle when the movable electrode contacts the opposite electrode. Therefore, in the conventional art, it is necessary to prevent a false detection by increasing the threshold value or the torque limit.

However, in the present invention, it is possible to obtain the fourth rotational angle in a state in which the movable electrode 11b contacts the opposite electrode 12b without pushing it in from the third rotational angle in a state in which the movable electrode 11b pushes in the opposite electrode 12b. Thus, in the present invention, it is possible, while preventing a false detection, to accurately obtain a rotational angle of the servo motor 14 when the movable electrode 11b contacts the opposite electrode 12b.

Further, in order to acquire the first rotational angle P1, the second rotational angle P2, and the rotational angle correction amount D, it is necessary to mount the reference movable electrode 11a and the reference opposite electrode 12a to the spot welding gun 13. However, the first rotational angle P1, etc., may be acquired just once and stored in the storage unit 28. In such an instance, there is no need to remove the movable electrode 11b or the like from the spot welding gun 13 to which are mounted the movable electrode 11b to be measured and the opposite electrode 12b to be measured, so that the operation efficiency can be prevented from reduction.

Advantageous Effect of the Invention

In the first aspect of the present invention, when a load on the servo motor which may be caused when the movable electrode is moved is changed due to various factors, e.g., even when a mechanical element is subjected to deterioration due to aging, it is possible to accurately measure a rotational angle of the servo motor when the movable electrode and the opposite electrode contact or abut each other.

In the second and eighth aspects of the present invention, when each of the movable electrode to be measured and the opposite electrode to be measured is of the same kind as the reference movable electrode and the reference opposite electrode, it is possible to grasp an amount of change in position of the distal end of each of the reference movable electrode and the reference opposite electrode based on an amount of change of the rotational angle.

In the third to fifth and ninth to eleventh aspects of the present inventions, it is possible to accurately determine the first rotational angle, which serves as a reference.

In the sixth and twelfth aspects of the present invention, it is possible to acquire the second rotational angle and the third rotational angle in a state in which the reference movable electrode positively pushes in the reference opposite electrode or in a state in which the movable electrode to be measured positively pushes in the opposite electrode to be measured.

While the present invention has been described using exemplary embodiments thereof, those skilled in the art could understand that the above-described changes and various other changes, omissions, and additions may be made without departing from the scope of the present invention.

The invention claimed is:

1. A measuring method for measuring a rotational angle of a servo motor in a spot welding gun to which a movable electrode driven by the servo motor and an opposite electrode disposed in opposing relationship to the movable electrode are mounted, the measuring method comprising steps of:
    a first rotational angle acquisition step that, in a state in which a reference movable electrode and a reference opposite electrode are mounted to the spot welding gun, acquires, as a first rotational angle, a rotational angle of the servo motor when the reference movable electrode is brought into contact with the reference opposite electrode by driving the servo motor;
    a second rotational angle acquisition step that acquires, as a second rotational angle, a rotational angle of the servo motor when the reference movable electrode is pushed in with respect to the reference opposite electrode with a predetermined pressing force;
    a rotational angle correction amount acquisition step that acquires, as a rotational angle correction amount, a deviation between the first rotational angle and the second rotational angle;
    a third rotational angle acquisition step that, in a state in which a movable electrode to be measured and an opposite electrode to be measured are mounted to the spot welding gun, acquires, as a third rotational angle, a rotational angle of the servo motor when the movable electrode to be measured is pushed in with respect to the opposite electrode to be measured with a pressing force substantially the same as the pressing force when the second rotational angle is acquired; and
    a fourth rotational angle acquisition step that acquires a fourth rotational angle by correcting the third rotational angle with the rotational angle correction amount.

2. The measuring method according to claim 1 further comprising a step that obtains a deviation between the first rotational angle and the fourth rotational angle after the fourth rotational angle acquisition step.

3. The measuring method according to claim 1, wherein at the first rotational angle acquisition step:
    a current or an estimated disturbance torque of the servo motor is monitored; and
    when the current or the estimated disturbance torque exceeds a predetermined threshold value, it is determined that the reference movable electrode contacts the reference opposite electrode, so that the reference movable electrode is stopped and a rotational angle of the servo motor is acquired as the first rotational angle.

4. The measuring method according to claim 1, wherein at the first rotational angle acquisition step:
    a predetermined torque limit is applied to the servo motor; and
    a rotational angle of the servo motor when the reference movable electrode is stopped by the torque limit as a result of the reference movable electrode contacting the reference opposite electrode is acquired as the first rotational angle.

5. The measuring method according to claim 1, wherein at the first rotational angle acquisition step:
    an image of at least one of the reference movable electrode and the reference opposite electrode is successively imaged at an imaging position; and
    based on the imaged image, a rotational angle of the servo motor when the reference movable electrode contacts the reference opposite electrode is acquired as the first rotational angle.

6. The measuring method according to claim 1, wherein the predetermined pressing force is made such that the current or the estimated disturbance torque is sufficiently larger than a load on the servo motor which is caused when the movable electrode is moved.

7. A measuring device for measuring a rotational angle of a servo motor in a spot welding gun to which a movable electrode driven by the servo motor and an opposite electrode disposed in opposing relationship to the movable electrode are mounted, the measuring device comprising:
    a first rotational angle acquisition unit that, in a state in which a reference movable electrode and a reference opposite electrode are mounted to the spot welding gun, acquires, as a first rotational angle, a rotational angle of the servo motor when the reference movable electrode is brought into contact with the reference opposite electrode by driving the servo motor;

a second rotational angle acquisition unit that acquires, as a second rotational angle, a rotational angle of the servo motor when the reference movable electrode is pushed in with respect to the reference opposite electrode with a predetermined pressing force;

a rotational angle correction amount acquisition unit that acquires, as a rotational angle correction amount, a deviation between the first rotational angle and the second rotational angle;

a third rotational angle acquisition unit that, in a state in which a movable electrode to be measured and an opposite electrode to be measured are mounted to the spot welding gun, acquires, as a third rotational angle, a rotational angle of the servo motor when the movable electrode to be measured is pushed in with respect to the opposite electrode to be measured with a pressing force substantially the same as the pressing force when the second rotational angle is acquired; and a fourth rotational angle acquisition unit that acquires a fourth rotational angle by correcting the third rotational angle with the rotational angle correction amount.

8. The measuring device according to claim 7 further comprising a deviation calculating unit that acquires a deviation between the first rotational angle and the fourth rotational angle after the fourth rotational angle is acquired.

9. The measuring device according to claim 7, wherein the first rotational angle acquisition unit monitors a current or an estimated disturbance torque of the servo motor, and when the current or the estimated disturbance torque exceeds a predetermined threshold value, determines that the reference movable electrode contacts the reference opposite electrode, thereby stopping the reference movable electrode and acquiring a rotational angle of the servo motor as the first rotational angle.

10. The measuring device according to claim 7, wherein the first rotational angle acquisition unit applies a predetermined torque limit to the servo motor, and acquires, as the first rotational angle, a rotational angle of the servo motor when the reference movable electrode is stopped by the torque limit as a result of the reference movable electrode contacting the reference opposite electrode.

11. The measuring device according to claim 7, wherein the first rotational angle acquisition unit further comprises an imaging unit that successively images, at an imaging position, an image of at least one of the reference movable electrode and the reference opposite electrode, and wherein based on the imaged image, the first rotational angle acquisition unit acquires, as the first rotational angle, a rotational angle of the servo motor when the reference movable electrode contacts the reference opposite electrode.

12. The measuring device according to claim 7, wherein the predetermined pressing force is made such that the current or the estimated disturbance torque is sufficiently larger than a load on the servo motor which is caused when the movable electrode is moved.

* * * * *